Oct. 7, 1958     A. E. KITTREDGE     2,855,363
WATER TREATMENT

Filed July 20, 1953     2 Sheets-Sheet 1

INVENTOR
*Arthur E. Kittredge.*
BY
ATTORNEYS.

Oct. 7, 1958  A. E. KITTREDGE  2,855,363
WATER TREATMENT
Filed July 20, 1953  2 Sheets-Sheet 2

INVENTOR
Arthur E. Kittredge
BY
ATTORNEYS.

United States Patent Office 2,855,363
Patented Oct. 7, 1958

2,855,363

WATER TREATMENT

Arthur E. Kittredge, Audubon, N. J., assignor to American Water Softener Co., Philadelphia, Pa., a corporation of New Jersey Application July 20, 1953, Serial No. 368,934

17 Claims. (Cl. 210—30)

The present invention relates to water treatment by anion exchange material, and to the regeneration of the anion exchange material.

The present application is a continuation-in-part of my copending application Serial No. 275,745, filed March 10, 1952, for Water Treatment, now abandoned.

A purpose of the invention is to remove carbon dioxide present as such in water by anion exchange using an exchange material having both exchangeable chloride and hydroxyl ions.

A further purpose is to regenerate an ion exchange material, used in treating water, by a regenerating solution or solutions of alkali metal chloride, such as sodium, potassium or ammonium chloride and of alkali metal hydroxide, such as potassium or ammonium hydroxide.

A further purpose is to dealkalize water, suitably in a water softening plant, by an anion exchange material having exchangeable chloride ions which exchange for bicarbonate ions in the water, and thus substitute sodium chloride in the water, which has a neutral reaction, for sodium bicarbonate, which has an alkaline reaction, and concurrently to convert free carbon dioxide in the water to bicarbonate ions by raising the pH due to exchangeable hydroxyl ions on the anion exchange material, and replace the bicarbonate ions thus formed for chloride ions on the anion exchange material. Thus bicarbonate ions from two sources are absorbed by the anion exchange material in the exchange process; those initially present in the water being treated and those formed from the carbon dioxide present as such.

A further purpose is to increase the efficiency of regeneration, reduce the time and increase the regeneration capacity of an anion exchanger by preventing bubble formation and particularly evolution of carbon dioxide, and converting bicarbonate ions to bivalent ions which are more efficiently exchanged.

A further purpose is to place a cation exchanger ahead of the anion exchange to prevent deposition of magnesium in the anion exchanger.

A further purpose is to employ less alkali metal hydroxide, such as sodium, potassium or ammonium hydroxide, in regenerating than alkali metal chloride, such as sodium, potassium or ammonium chloride preferably using from 5 to 25 percent by weight of alkali metal hydroxide of the total of alkali metal hydroxide plus chloride, and most desirably approximately 10 percent by weight.

Further purposes appear in the specification and in the claims.

In the drawings I have chosen to illustrate a few only of the numerous embodiments in which my invention appears, selecting the forms shown from the standpoints of convenience in illustration, satisfactory operation and clear demonstration of the principles involved.

In the drawings like numerals refer to like parts.

Figure 1:
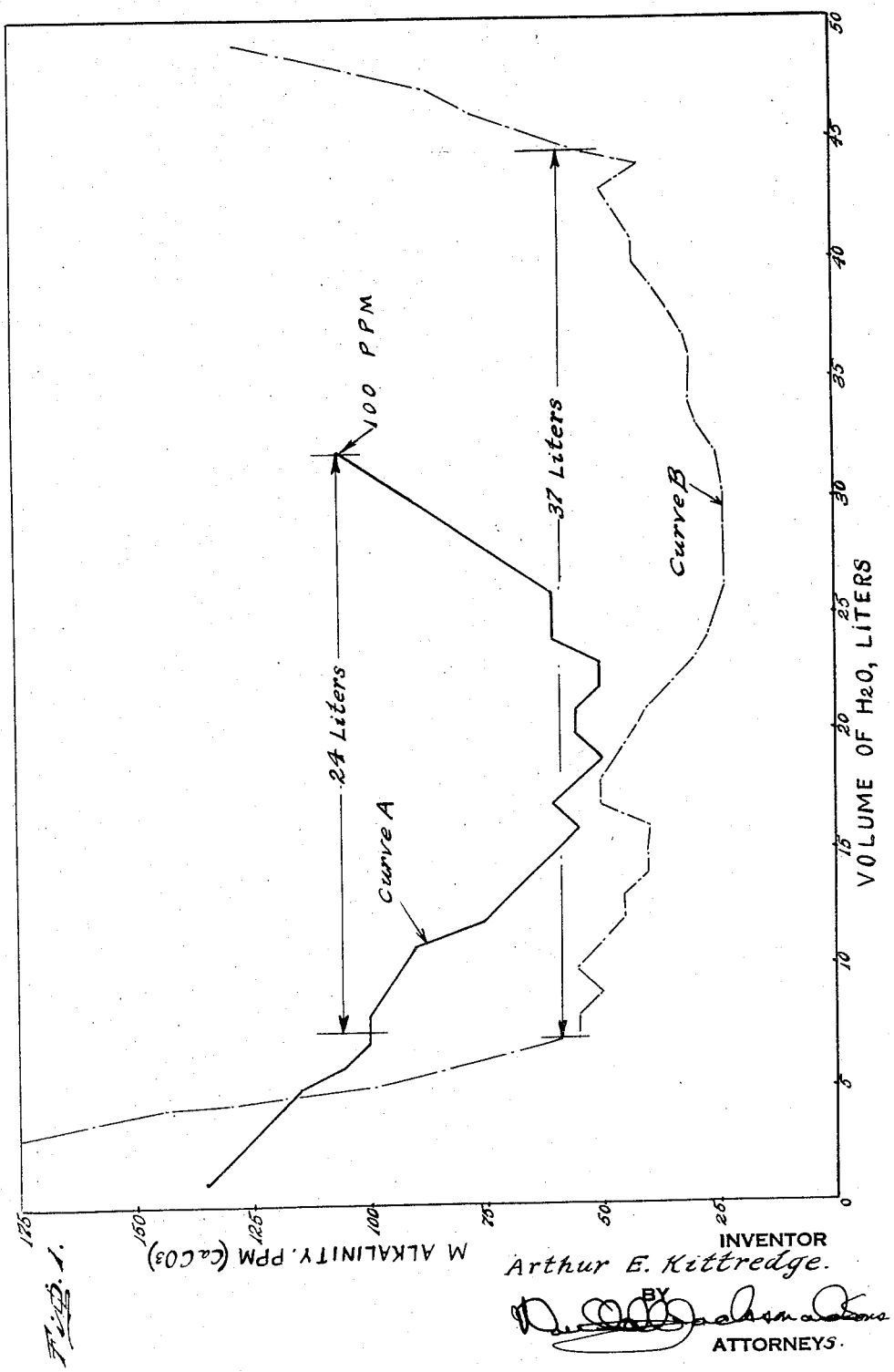
Figure 1 is a curve useful in explaining the invention.

Water has for many years been softened by zeolite cation exchange materials which remove calcium and magnesium ions in exchange for sodium ions. More recently, anion exchangers, usually synthetic resins have been used to dealkalize water, usually after softening, by exchanging bicarbonate ions in the inlet water supply for chloride ions on the exchange material, thus substituting a salt of a strong base and a strong acid (NaCl) for a salt of a strong base and a weak acid ($NaHCO_3$) in the solution. Such anion exchangers are regenerated with sodium chloride.

As part of the process of demineralization, anion exchangers have been used to remove free carbon dioxide from water when regenerated by sodium hydroxide. This process has proved to be expensive and undesirable for removal of carbon dioxide because of the cost of the sodium hydroxide, and efficient demineralizer plants usually include an aeration tower to take out carbon dioxide before the water enters the highly basic anion exchanger.

Dealkalization can also be accomplished by regenerating the anion exchange material with sodium hydroxide, and this would remove carbon dioxide, but it would undesirably increase the hydrate alkalinity.

When reference is made herein to an alkali metal chloride or hydroxide it is intended to include the chloride or hydroxide of sodium, potassium or ammonium. Rubidium, cesium and virginium, while suitable, are too rare to be available.

In accordance with the present invention, I am able to remove carbon dioxide and dealkalize without undesirable increase of the hydrate alkalinity. I accomplish this by regenerating the anion exchange material with both an alkali metal chloride, such as sodium, potassium or ammonium chloride, and also an alkali metal hydroxide such as sodium, potassium or ammonium hydroxide. The burden of the exhaustion exchange is still accomplished by the chloride, but the hydroxyl ions are present to convert carbon dioxide in the water being treated to bicarbonate ions which exchange for chloride ions.

The sodium, potassium or ammonium chloride and sodium, potassium or ammonium hydroxide used for regeneration of the anion exchanger may be used in the same solution or may be employed successively in either order as far as the broad aspects of the present invention are concerned. It is important that the burden of the exhaustion exchange be performed by the chloride ion, while the hydroxyl ions will raise the pH, and convert the free carbon dioxide to bicarbonate ions, which will be absorbed in exchange for chloride ions.

In general the quantity of alkali metal hydroxide, such as sodium, potassium, lithium, or ammonium hydroxide will be more than 1 percent and should preferably be from 5 to 25 percent by weight of the total of the alkali metal chloride plus hydroxide. It is believed that it will rarely be desirable to use more than 50 percent of alkali metal hydroxide of the total weight of alkali metal chloride plus hydroxide. For treatment of Philadelphia city water it has been found that the percentage of alkali metal hydroxide (sodium hydroxide) should best be 11 percent by weight of this total, the balance being alkali metal chloride (sodium chloride). In any case the content of alkali metal chloride will be more than 3 percent of the total alkali metal chloride plus hydroxide. When a sequence of softening, dealkalizing and decarbonating is used with a cation exchanger followed by an anion exchanger, an effluent water is produced having an average pH value of about 9.

A further advantage results from regenerating the anion exchange material with alkali metal chloride, such as sodium, potassium or lithium chloride, and a lesser amount of alkali metal hydroxide, namely that evolution of carbon dioxide, which might interfere with regeneration, is prevented or reduced.

When an anion exchange material suitable for the absorption of bicarbonate ions is regenerated with an alkali metal chloride in solution, the regenerant solution is required to absorb a very high concentration of bicarbonate ions in exchange for the chloride ions it gives up to the exchange material. Whenever there is a high concentration of bicarbonate ion salts in a water solution, there is free carbon dioxide present regardless of the pH, although the concentration of free carbon dioxide is not considered to be significant at a pH above 8.3.

At a pH of 8.3 about 1.5 percent by weight of the total carbon dioxide is present as free carbon dioxide or carbonic acid, about 98.5 percent is present as bicarbonate ion, and a very small quantity is present as normal carbonate ion.

When properly regenerated the highly basic anion exchange materials will produce a capacity of more than 10 kilograins per cubic foot as calcium carbonate when applied to reduce alkalinity. The anion exchange material should have a regeneration level of about 4 pounds of sodium chloride per cubic foot applied in approximately a 5 percent solution by weight in cold water. This contemplates a solution of about one-half pound of sodium chloride in one gallon of water, and therefore 8 gallons of this solution are required to regenerate one cubic foot of anion exchange material.

When 10,000 grains of alkalinity must be absorbed by 8 gallons of regenerant solution, the assumed alkalinity of the regenerant solution is 1250 grains per gallon or 21,300 parts per million. Of this alkalinity, 88 percent or 18,700 parts per million represents carbon dioxide in various forms, and of this 1.5 percent or 280 parts per million exists as free carbon dioxide, which would be in solution as carbonic acid, if it could stay in solution.

However, the solubility limit of carbon dioxide in cold water is only about 140 parts per million per pound per square inch partial gas pressure, and if all of the 280 parts per million of carbon dioxide were absorbed, the pressure of gases in solution would be raised 2 p. s. i. If the solution was originally at equilibrium with the atmosphere, its internal pressure will include, in addition to its own vapor pressure, the solution pressures of oxygen and nitrogen. The sudden addition of 2 p. s. i. additional pressure will cause gas bubbles to precipitate within the anion exchange bed, blanket the surfaces of the granules and prevent efficient regeneration.

The above discussion is predicated on the assumption that the regeneration takes place at a pH of 8.3. Actually when an anion exchange bed is regenerated with sodium chloride alone, the initial pH is likely to be of the order of 6.5 and then to rise due to concentration of the bicarbonate ion. At pH values around 6.4 over 50 percent of the total carbon dioxide is in the form of carbonic acid or free dissolved carbon dioxide. Thus it can be seen that there is a very real possibility of blocking regeneration by precipitation of carbon dioxide gas bubbles.

Figure 1 is a graph plotting as ordinate M alkalinity (methyl orange) in parts per million (calcium carbonate) of effluent water and as abscissae volume of water in liters passing through the exchange bed in exhaustion. The exhaustion runs were made with an artificially prepared water, which in the case of curve A had 750 p. p. m. alkalinity and in the case of curve B had 700 p. p. m. alkalinity, mostly sodium bicarbonate. The entering pH in each case was 8.3 and the removal of free carbon dioxide was not involved.

Curve A, Figure 1, shows the results using a straight sodium chloride solution regeneration, with 4 pounds of 10 percent by weight sodium chloride solution per cubic foot of anion exchange material. Somewhat better results are obtained using brine of a concentration of about 5 percent and not over 6 percent by weight. The bed was 24 inches deep and the anion exchange resin was that known commercially as Rohm and Haas IRA 410. The curves show the volume and alkalinity of the treated water after regeneration of the anion exchange material in different ways. Curve A shows a capacity of 24 liters of treated water with a leakage of less than 100 p. p. m. alkalinity.

Curve B shows the results using approximately the same water in exactly the same exchange material, adding for regeneration 0.44 pound of sodium hydroxide to the 4 pounds of sodium chloride per cubic foot of anion exchange material. In this case also somewhat better results are obtained using brine of a concentration of about 5 percent and not over 6 percent by weight, with sodium hydroxide in the proportions specified. In this case the capacity was 37 liters of treated water or an increase of 50 percent, and the average leakage was less than ½ that occurring when straight sodium chloride regeneration was used.

It is evident that the efficiency of the regeneration was greatly increased by the use of sodium chloride with sodium hydroxide. Without restricting myself to a particular theory, I believe this to be due to holding the pH value during regeneration so high that the free carbon dioxide or carbonic acid component in the solution was suppressed. The pH of the regenerating solution was above 11 and under such conditions there is no precipitible amount of free carbon dioxide in a highly alkaline solution.

The advantages of the combined chloride and hydroxide regeneration on the exhaustion exchange may be described as follows. Hydroxyl ions are present as well as chloride ions at the anion exchanger, and the hydroxyl ions convert the bicarbonate ions in the water being treated to normal carbonate ions which are bivalent. The bivalent normal carbonate ions are more strongly attracted to the anion exchange material to exchange for chloride than are the monovalent bicarbonate ions. There is also of course the possibility that the hydroxyl ions on the anion exchanger exert a catalytic effect to improve the quality of the effluent water.

Of course with the amount of sodium hydroxide used, all bicarbonate ions cannot be changed to normal carbonate ions. For example to obtain an exchange capacity of 10 kilograins of bicarbonate salts as calcium carbonate, by absorption of normal carbonate ions by a chloride dealkalizer, would require about 1.2 pounds of sodium hydroxide to convert the bicarbonates to normal carbonates before the chloride exchange.

The advantage of the process of the invention appears to lie particularly in the more efficient chloride regeneration by suppressing evolution of carbon dioxide through partially converting the regenerant solution to normal carbonates and thereby reducing the concentration of bicarbonates and therefore of free carbon dioxide.

The invention may be applied to advantage in any suitable ion exchange equipment, of which the following are examples.

Figure 2:
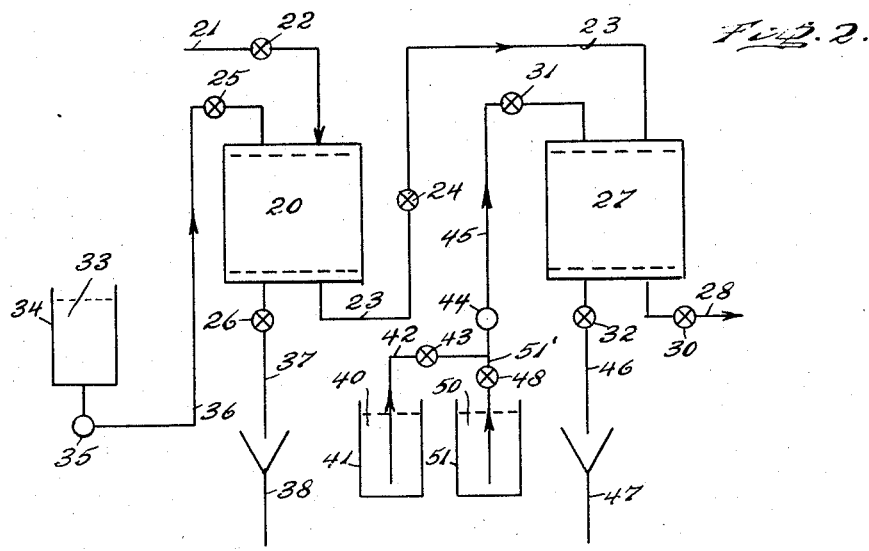
Figures 2 and 3 are diagrammatic views showing water treating plants of variant forms according to the invention.

In Figure 2 I show a cation exchanger 20, suitably a zeolite bed in a suitable tank, receiving raw water for treatment through pipe 21 and valve 22 in open position. The softened water discharges through pipe 23 and valve 24 in open position, regenerating valve 25 and drain valve 26 being closed. The softened water enters anion exchanger 27 through pipe 23. The anion exchanger is a bed of any suitable basic anion exchange resin as well known in the art, such as an amine, in a suitable tank. After passing through the anion exchanger, the softened dealkalized and decarbonated water leaves by pipe 28 and valve 30 in open position to the service. Regenerating valve 31 and drain valve 32 are closed at this stage.

When regeneration is to be accomplished, inlet valve 22, interconnection valve 24 and outlet valve 30 are closed. The cation exchanger is regenerated by pumping brine solution 33 from tank 34 through pump 35, pipe 36 and valve 25 in open position into the cation exchange bed at one end and withdrawing it through pipe 37 and valve 26 in open position to drain 38 at the other end.

The anion exchange material is regenerated by introducing sodium hydroxide solution 40 from tank 41 through pipe 42, valve 43 in open position, pump 44, pipe 45 and valve 31 in open position to one end of the anion exchange bed and withdrawing it through pipe 46, valve 32 in open position and drain 47 at the other end. With valve 48 closed, only sodium hydroxide solution is employed first. Then by opening valve 48 and closing valve 43, only brine 50 is taken through the anion exchanger, from tank 51 and pipe 51' to pump 44, pipe 45 and through valve 31 in open position to one end of the anion exchanger, passing at the other end to the drain.

For still better results both valves 43 and 48 are left open at the same time, regulating the feed so that the sodium hydroxide is 2 to 25 percent by weight of the total of sodium chloride plus sodium hydroxide.

It is less desirable to feed the brine before the sodium hydroxide or the like, and it is best to feed both together, although good results are obtained by separate feeding where the sodium hydroxide is fed first.

Figure 3:
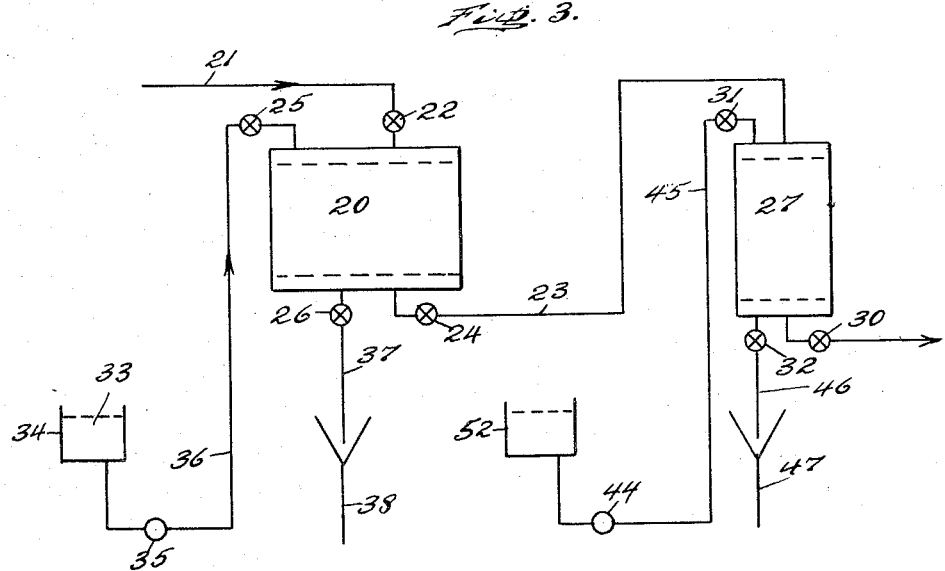

To rinse, valves 22 and 24 are opened, while valves 25, 26, 43, 48 and 31 are all closed. When rinsing is complete, drain valve 32 is closed and service valve 30 is opened.

Where the sodium hydroxide is always to be added with the brine, this can best be done by using a single solution as in Figure 3. Figure 3 also illustrates a system well suited to a plant having a laundry and a heating system, using a sodium chloride regenerated zeolite water softener for treating all water. This treatment is very satisfactory for laundry work but quite unsatisfactory for boiler feed because of the carbon dioxide liberated in the boiler by the break down of sodium bicarbonate released from the boiler water supply. In most of these plants the amount of water required for the boiler feed is only a small fraction of the total amount of water softened. It is therefore desirable to use a supplemental anion exchanger to dealkalize the boiler feed supply and reduce the free carbon dioxide content.

As shown in Figure 3, the cation exchanger may be an existing zeolite exchanger regenerated by sodium chloride solution. Tank 52 contains a mixed solution of sodium hydroxide and sodium chloride, with the sodium hydroxide 2 to 25 percent by weight of the total sodium chloride plus sodium hydroxide. The concentration of the brine is about 5 percent and desirably not over 6 percent by weight.

In the forms of Figures 2 and 3 the anion exchange material is protected from deposition of magnesium ions due to the fact that the water encounters the cation exchanger first, removing the magnesium. Also in these forms the regenerant solution from the cation exchanger goes direct to the drain, and not through the anion exchanger.

Unless otherwise indicated, all percentages herein are by weight.

In view of my invention and disclosure variations and modifications to meet individual whim or particular need will doubtless become evident to others skilled in the art, to obtain all or part of the benefits of my invention without copying the process and product shown, and I therefore claim all such insofar as they fall within the reasonable spirit and scope of my claims.

Having thus described my invention, what I claim as new and desire to secure by Letters Patent is:

1. The process of treating water, which comprises bringing water into contact with an anion exchange synthetic resin, regenerating the anion exchange resin by treatment with a solution of an alkali metal chloride and a solution of an alkali metal hydroxide in the proportions of between 1 and 50 percent alkali metal hydroxide and between 50 and 99 percent alkali metal chloride of the total alkali metal chloride plus hydroxide, and repeating the cycle, whereby the anion exchange resin which comes into contact with the water has exchangeable chloride and hydroxyl ions.

2. The process of treating water, which comprises bringing water into contact with an anion exchange synthetic resin, regenerating the anion exchange resin by treatment with a solution of sodium chloride and a solution of sodium hydroxide in the proportions of between 1 and 50 percent alkali metal hydroxide and between 50 and 99 percent alkali metal chloride of the total alkali metal chloride plus hydroxide, and repeating the cycle, whereby the anion exchange resin which comes into contact with the water has exchangeable chloride and hydroxyl ions.

3. The process of treating water, which comprises bringing water into contact with an anion exchange synthetic resin, regenerating the anion exchange resin by treatment with a solution containing both alkali metal chloride and alkali metal hydroxide in the proportions of between 1 and 50 percent alkali metal hydroxide and between 50 and 99 percent alkali metal chloride of the total alkali metal chloride plus hydroxide, and repeating the cycle, whereby the anion exchange resin which comes into contact with the water has exchangeable chloride and hydroxyl ions.

4. The process of treating water, which comprises bringing water into contact with an anion exchange synthetic resin, regenerating the anion exchange resin by treatment with a solution containing both sodium chloride and sodium hydroxide in the proportions of between 1 and 50 percent alkali metal hydroxide and between 50 and 99 percent alkali metal chloride of the total alkali metal chloride plus hydroxide, and repeating the cycle, whereby the anion exchange resin which comes into contact with the water has exchangeable chloride and hydroxyl ions.

5. The process of treating water, which comprises bringing water into contact with an anion exchange synthetic resin, regenerating the anion exchange resin by treatment with a solution of an alkali metal hydroxide, then regenerating the anion exchange resin by treatment with a solution of an alkali metal chloride, the alkali metal hydroxide and alkali metal chloride being in the proportions of between 1 and 50 percent alkali metal hydroxide and between 50 and 99 percent alkali metal chloride of the total alkali metal chloride plus hydroxide, and repeating the cycle whereby the anion exchange resin which comes into contact with the water has both exchangeable chloride and hydroxyl ions.

6. The process of treating water, which comprises bringing water into contact with an anion exchange synthetic resin, regenerating the anion exchange resin by treatment with a solution of an alkali metal chloride and a solution of an alkali metal hydroxide, the quantity of alkali metal hydroxide used in regeneration being from 5 to 25 percent by weight of the total alkali metal chloride plus hydroxide, and repeating the cycle, whereby the anion exchange resin which comes into contact with the water has exchangeable chloride and hydroxyl ions.

7. The process of treating water, which comprises bringing water into contact with an anion exchange synthetic resin, regenerating the anion exchange resin by treatment with a solution of an alkali metal chloride and a solution of an alkali metal hydroxide, the quantity of alkali metal hydroxide used in regeneration being approximately 11 percent by weight of the total alkali metal chloride plus hydroxide, and repeating the cycle, whereby the anion exchange resin which comes into contact with the water has exchangeable chloride and hydroxyl ions.

8. The process of treating water, which comprises bringing water into contact with an anion exchange synthetic resin, regenerating the anion exchange resin by treatment with a solution of sodium chloride and a solution of sodium hydroxide, the quantity of sodium hydroxide used in regeneration being from 5 to 25 percent by weight of the total sodium chloride plus hydroxide, and repeating the cycle, whereby the anion exchange resin which comes into contact with the water has exchangeable chloride and hydroxyl ions.

9. The process of treating water, which comprises bringing water into contact with an anion exchange synthetic resin, regenerating the anion exchange resin by treatment with a solution of sodium chloride and a solution of sodium hydroxide, the quantity of sodium hydroxide used in regeneration being approximately 11 percent by weight of the total sodium chloride plus hydroxide, and repeating the cycle, whereby the anion exchange resin which comes into contact with the water has exchangeable chloride and hydroxyl ions.

10. The process of regenerating an anion exchange synthetic resin, which comprises treating the anion exchange resin with an alkali metal chloride and an alkali metal hydroxide in water solution in the proportions of between 1 and 50 percent alkali metal hydroxide and between 50 and 99 percent alkali metal chloride of the total alkali metal chloride plus hydroxide.

11. The process of regenerating an anion exchange synthetic resin, which comprises treating the anion exchange resin with a water solution containing both alkali metal chloride and alkali metal hydroxide in the proportions of between 1 and 50 percent alkali metal hydroxide and between 50 and 99 percent alkali metal chloride of the total alkali metal chloride plus hydroxide.

12. The process of regenerating an anion exchange synthetic resin, which comprises treating the anion exchange resin with an alkali metal chloride and an alkali metal hydroxide in water solution, the quantity of alkali metal hydroxide used in regeneration being from 5 to 25 percent by weight of the total alkali metal chloride plus hydroxide.

13. The process of regenerating an anion exchange synthetic resin, which comprises treating the anion exchange resin with an alkali metal chloride and an alkali metal hydroxide in water solution, the quantity of alkali metal hydroxide used in regeneration being approximately 11 percent by weight of the total alkali metal chloride plus hydroxide.

14. The process of treating water which comprises bringing water into contact with an anion exchange synthetic resin, regenerating the anion exchange resin by treatment with a solution of an alkali metal hydroxide, then regenerating the anion exchange resin by treatment with a solution of an alkali metal chloride, the quantity of alkali metal hydroxide used in regeneration being from 5 to 25 percent by weight of the total quantity of alkali metal chloride plus hydroxide, and repeating the cycle, whereby the anion exchange resin which comes into contact with the water has both exchangeable chloride and hydroxyl ions.

15. The process of dealkalizing and decarbonating a water supply, which comprises softening raw water in a cation exchanger, then dealkalizing and decarbonating the water after it leaves the cation exchanger by an anion exchanger containing anion exchange synthetic resin, regenerating the cation exchanger by an alkali metal chloride solution, regenerating the anion exchanger by an alkali metal chloride and an alkali metal hydroxide in solution in the proportions of between 1 and 50 percent alkali metal hydroxide and between 50 and 99 percent alkali metal chloride of the total alkali metal chloride plus hydroxide, and repeating the cycle of softening, dealkalizing and decarbonating on the one hand, and regenerating on the other hand, successively.

16. The process of dealkalizing and decarbonating a water supply, which comprises softening raw water in a cation exchanger, then dealkalizing and decarbonating the water after it leaves the cation exchanger by an anion exchanger containing anion exchange synthetic resin, regenerating the cation exchanger by an alkali metal chloride solution, regenerating the anion exchanger by an alkali metal chloride and an alkali metal hydroxide in solution, the quantity of alkali metal hydroxide being 5 to 25 percent by weight of the total alkali metal chloride plus hydroxide, and repeating the cycle of softening, dealkalizing and decarbonating on the one hand, and regenerating on the other hand, successively.

17. A process of removing alkalinity from water comprising contacting the water with an anion exchange material which has been regenerated with sodium chloride and sodium hydroxide, the ratio of sodium chloride to sodium hydroxide being within the range from about 10 to 1 to about 5 to 1.

References Cited in the file of this patent

UNITED STATES PATENTS

| | | |
|---|---|---|
| 1,249,368 | Foster | Dec. 11, 1917 |
| 2,208,172 | Urbain | July 16, 1940 |
| 2,309,366 | Urbain | Jan. 26, 1943 |
| 2,404,367 | Durant et al. | July 23, 1946 |